United States Patent [19]

Stout et al.

[11] Patent Number: 4,960,615

[45] Date of Patent: Oct. 2, 1990

[54] COMPOSITION AND METHOD FOR USING COMPOSITION TO REDUCE THE EFFECTS OF WATER AND ULTRAVIOLET RADIATION ON CARBON CENTRAL STRUCTURES

[76] Inventors: Mike F. Stout, 12101 Windmill Rd., Oklahoma City, Okla. 73162; Dean E. Brunken, 3601 NE. 140th Terrace Ct., Edmond, Okla. 73013; Arnulf P. Hagen, Rte. 1, Box 466H, Noble, Okla. 73068

[21] Appl. No.: 290,025

[22] Filed: Dec. 27, 1988

Related U.S. Application Data

[63] Continuation-in-part of Ser. No. 94,650, Sep. 9, 1987, abandoned.

[51] Int. Cl.$^5$ ............................................. B05D 5/00
[52] U.S. Cl. .................................. 427/160; 427/384; 427/387; 427/395; 427/397
[58] Field of Search ............... 427/136, 341, 396, 395, 427/387, 384, 160, 397; 106/287.1, 287.12, 287.14, 287.16, 287.15, 287.19; 528/10, 31, 32, 36, 43

[56] References Cited

U.S. PATENT DOCUMENTS

| | | | |
|---|---|---|---|
| 4,073,972 | 2/1978 | Nestler et al. | 427/136 |
| 4,076,868 | 2/1978 | Roth et al. | 427/387 |
| 4,084,021 | 4/1978 | Sandvig | 427/44 |
| 4,221,688 | 9/1980 | Johnson et al. | 524/251 |
| 4,349,610 | 9/1982 | Parker | 428/447 |
| 4,423,112 | 12/1983 | Luthringshauser | 428/389 |
| 4,486,476 | 12/1984 | Fritsch et al. | 427/387 |
| 4,555,420 | 11/1985 | Lucas | 427/387 |
| 4,595,599 | 6/1986 | Brown et al. | 427/5 |
| 4,600,657 | 7/1986 | Wegehaupt et al. | 427/136 |
| 4,604,443 | 8/1986 | Chang et al. | 528/10 |

*Primary Examiner*—Janyce Bell
*Attorney, Agent, or Firm*—Dunlap, Codding, Peterson & Lee

[57] ABSTRACT

A composition comprising a silane, siloxane or combination thereof, a catalyst and an ultraviolet radiation absorber. The composition is applied to the surfaces of carbon central structures to diminish the harmful effects thereof of water and ultraviolet radiation. Some examples of carbon central structures as defined herein are fences, decks, awnings, seat covers, umbrellas, carpeting and furniture. The composition is applied to the surface to be treated and allowed a sufficient time in order to penetrate.

2 Claims, No Drawings

COMPOSITION AND METHOD FOR USING COMPOSITION TO REDUCE THE EFFECTS OF WATER AND ULTRAVIOLET RADIATION ON CARBON CENTRAL STRUCTURES

CROSS-REFERENCE TO RELATED APPLICATION

This application is a continuation-in-part of co-pending U.S. patent application Ser. No. 094,650 filed Sept. 9, 1987 now abandoned entitled A WATER REPELLANT COMPOSITION AND METHOD FOR USING SAME by inventors Dean E. Brunken, Arnulf P. Hagen and Mike F. Stout.

FIELD OF THE INVENTION

The present invention relates generally to compositions and methods for using compositions to reduce the effects of water and ultraviolet radiation on carbon central structures. Some examples of carbon central structures as used herein are wood, leather, paper, limestone and dolomite.

SUMMARY OF THE INVENTION

The present invention comprises a composition comprising a silane, siloxane or combination thereof, a catalyst and an ultraviolet radiation absorber. The composition is used on carbon central structures to diminish the deleterious effects thereon from water and ultraviolet radiation. This is sometimes referred to as weatherproofing.

The present invention also comprises a method whereby the composition is applied to carbon central structures. After the composition is applied to the surface of the item to be protected, a period of time is required to allow adequate penetration of the composition. It may be required to wet the surface with water after adequate penetration.

DETAILED DESCRIPTION OF THE PRESENT INVENTION

The disclosure in U.S. patent application 094,650, filed Sept. 9, 1987, entitled "A WATER REPELLANT COMPOSITION AND METHOD FOR USING SAME" is incorporated by reference herein and hereafter referred to as the "Brunken, et al. application".

The Brunken, et al. application discloses a water repellant composition and a method for using the composition on siliceous and carbon central structures to render those structures water repellant. The composition in the Brunken, et al. application comprises a silane, siloxane or combination thereof, and a catalyst. The catalyst serves to decrease the amount of expensive silane and/or siloxane needed in the composition to produce effective water repellant qualities.

The present invention comprises compositions and methods for using compositions for treating carbon central structures to diminish the deleterious effects of water and ultraviolet radiation thereon. The compositions of the present invention comprise a silane and/or siloxane, a catalyst and an ultraviolet radiation absorber.

There are many articles, kept both indoors and outdoors, that are exposed to water and/or ultraviolet radiation. Water and ultraviolet radiation act to produce a "weathered" or "aged" effect on exposed surfaces. This can diminish the aesthetic appeal and the functional life of the exposed articles. Therefore, it is desirable to treat these articles with a single product in a manner to diminish these harmful effects.

The structures to be treated, carbon central structures, may be organic, such as wood, leather, fabric, wicker or paper, or inorganic, such as limestone or dolomite. The carbon central structures may take various forms. Structures normally kept outdoors that may be treated are fences, decks, signs, benches, wicker furniture, outdoor carpet, or fabric used, for example, in awnings, seat covers or umbrellas. Indoor carbon central structures, whether in a building, home, car or any somewhat sheltered structure, can also be exposed to water and ultraviolet radiation. Some of these items preferably include carpet, seat covers, draperies, furniture, fabric and woodwork.

Preferably, the composition of the present invention comprises a silane and/or a siloxane with an ultraviolet radiation absorber and a catalyst. The silane has the general formula:

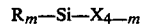

wherein m is 1 or 2, and X is a halogen, hydroxyl, R or $R_1$, R is an ultraviolet radiation absorber capable of reducing the effects of ultraviolet radiation on carbon central structures selected from a grouping of unsaturated or aromatic compounds, and R, being an alkyl group containing from 1 to about 8 carbon atoms, a hydroxyalkyl group, or an alkoxyalkyl group. The siloxane is represented by the general structure or formula:

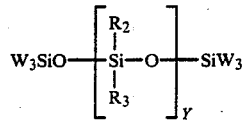

wherein $R_2$ and $R_3$ are ultraviolet radiation absorbers capable of reducing the effects of ultraviolet radiation on carbon central structures and are independently selected from a grouping of unsaturated or aromatic compounds. Y is an integer between 1 and about 100. W is a halogen, hydroxyl, alkyl, aryl or alkoxy.

The composition of the present invention preferably includes a silane and/or siloxane, a catalyst, and an ultraviolet radiation absorber in a medium. As used herein, the term "medium" means an emulsion or dispersion in water or gases or solutions in a carrier such as alcohol or hydrocarbons. For example, the compositions of the present invention can be incorporated in a medium containing a stain so that an application of that medium on a surface will stain the surface and render the surface resistant to water and ultraviolet radiation.

Since silanes and siloxanes are expensive, it is desirable to decrease the amount of the silane and/or siloxanes necessary in the composition. This is accomplished by the addition of a catalyst to the composition, preferably comprising tin and/or titanium. The catalyst made from titanium preferably is titanium acetylacetonate. The catalyst made from tin preferably is dibutyl tin dilaurate. The catalyst titanium acetylacetonate has been found to be the more effective catalyst in the present invention. However, a combination of catalysts dibutyl tin dilaurate and titanium acetylacetonate has also been found to be effective in accordance with the present invention.

The catalyst is present in the composition in a range from about one percent (1%) to about twenty-five percent (25%) by weight of the silane, siloxane or combination thereof. Further, the silane, siloxane or combination thereof is present in the composition in an amount in a range from about one percent (1%) to less than about twenty percent (20%) by weight of the composition. Solutions or emulsions or dispersions containing about ten percent (10%) by weight of the silane, siloxane or combination thereof have been found to be effective for treating carbon central structures for rendering such structures substantially water repellant.

The ultraviolet radiation absorber reduces the effects of ultraviolet radiation on carbon central structures treated in accordance with the present invention. The ultraviolet radiation absorber of the composition may be selected from a group of aromatic compounds or unsaturated compounds. The group of aromatic compounds from which the ultraviolet radiation absorber may be selected preferably comprises derivatives of a single ring or polycyclic aromatic compounds, including but not limited to, naphthalenes, anthracenes, phenanthrenes, pyrenes, naphthacenes, azulenes and their heteroatom derivatives such as purines, indoles, chromans, xanthones and quinolines. The group of unsaturated compounds from which the ultraviolet radiation absorber may be selected preferably comprises derivatives of ethylenes, dienes, acteylenes, alone or linked to aromatic groupings. The amount of ultraviolet radiation absorber may vary with the selection of the absorber, but an effective amount suitable to render the carbon central structure resistant to the effects of ultraviolet radiation preferably for a period of a few months is desirable.

When utilizing the compositions of the present invention, the carbon central structure surface should be clean and substantially dry prior to applying the composition. The composition of the present invention preferably is applied to the surface of the carbon central structure by spraying, brushing, rolling or immersing the article to be protected. Depending on the density and or porosity and or desired depth of penetration, the application rate may be as low as 400 square feet per gallon or as high as 50 square feet per gallon. For example, rough cedar can be effectively treated with a 5% silane and/or siloxane solution of the present invention in a solvent by spraying the solution on the surface at the rate of about 250 square feet per gallon.

After applying the composition to the carbon central structure surface, the structure preferably is not contacted by water for a period of time from about a few minutes to about twenty-four (24) hours in order for a reaction to be completed between the surface and the silane and/or siloxane in the composition. During this period of time, the compositions are permitted to migrate into the structure to achieve a desired penetration.

The composition and method of the present invention, absent the ultraviolet radiation absorber, have been tested for its waterproofing qualities in the Brunken, et al. application. For the water repellant effects on carbon central structures, see Test Nos. 1, 4, 6, 7, 8 and 9 in Ser. No. 094,650.

Changes may be made in the elements of the compositions or in the steps or the sequence of steps of the methods described herein without departing from the spirit and scope of the invention as defined in the following claims.

What is claimed is:

1. A method for treating wood or paper comprising the step of applying a composition capable of reducing the effects of ultraviolet radiation and water to the wood or paper surface wherein the composition comprises:

a silane or siloxane or combination thereof; and
   a catalyst;
   wherein the silane has the general formula:

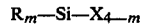

$$R_m\text{—}Si\text{—}X_{4-m}$$

wherein
   m is 1 or 2; and
   X is a halogen, hydroxyl, R or $R_1$;
   R is an ultraviolet radiation absorber bonded directly to the silicon atom and is capable of reducing the effects of ultraviolet radiation on wood or paper selected from a grouping of unsaturated or aromatic compounds, and $R_1$ being an alkyl group containing from 1 to about 8 carbon atoms, a hydroxyalkyl group, or an alkoxyalkyl group; and
   wherein the siloxane is represented by the general structure or formula:

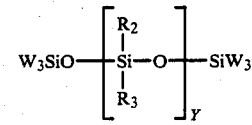

wherein $R_2$ and $R_3$ are bonded directly to the silicon atom and are ultraviolet radiation absorbers capable of reducing the effects of ultraviolet radiation on wood or paper and are independently selected from a grouping of unsaturated or aromatic compounds, and Y is an integer between 1 and about 100; and wherein W is a halogen, hydroxyl, alkyl, aryl or alkoxy,
   wherein the composition is not an emulsion and is not cured by ultraviolet radiation, and further comprising:
   a catalytically effective amount of titanium acetylacetonate and dibutyl tin dilaurate.

2. The method of claim 1 wherein the ultraviolet radiation absorber selected from the grouping of unsaturated compounds comprises derivatives of ethylenes, dienes, acetylenes, alone or linked to aromatic groupings.

* * * * *